April 30, 1940.  O. JACOBS  2,198,941
ROTATING WING AIRCRAFT
Filed March 18, 1939   3 Sheets-Sheet 2
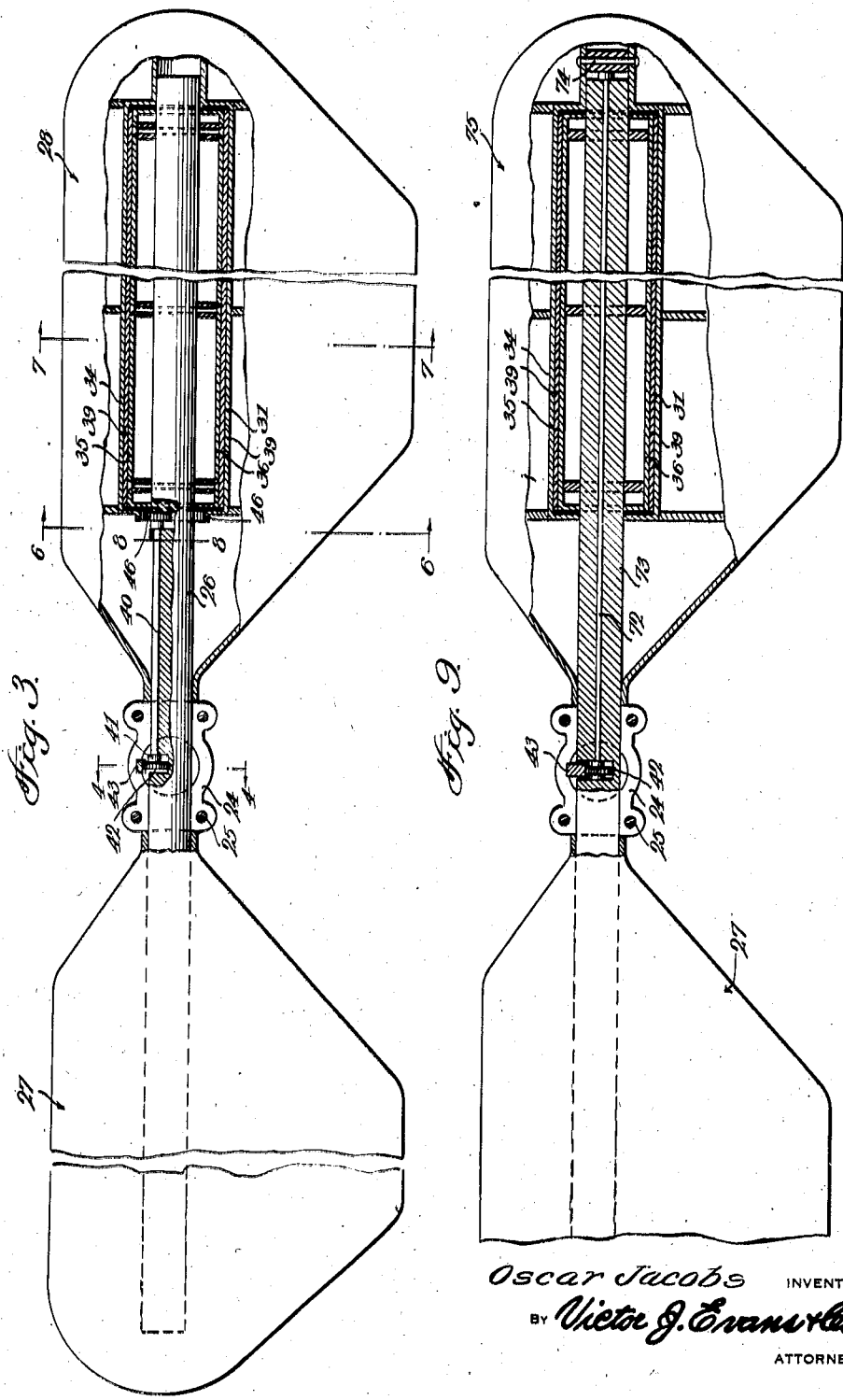
Oscar Jacobs INVENTOR
BY Victor J. Evans & Co.
ATTORNEYS

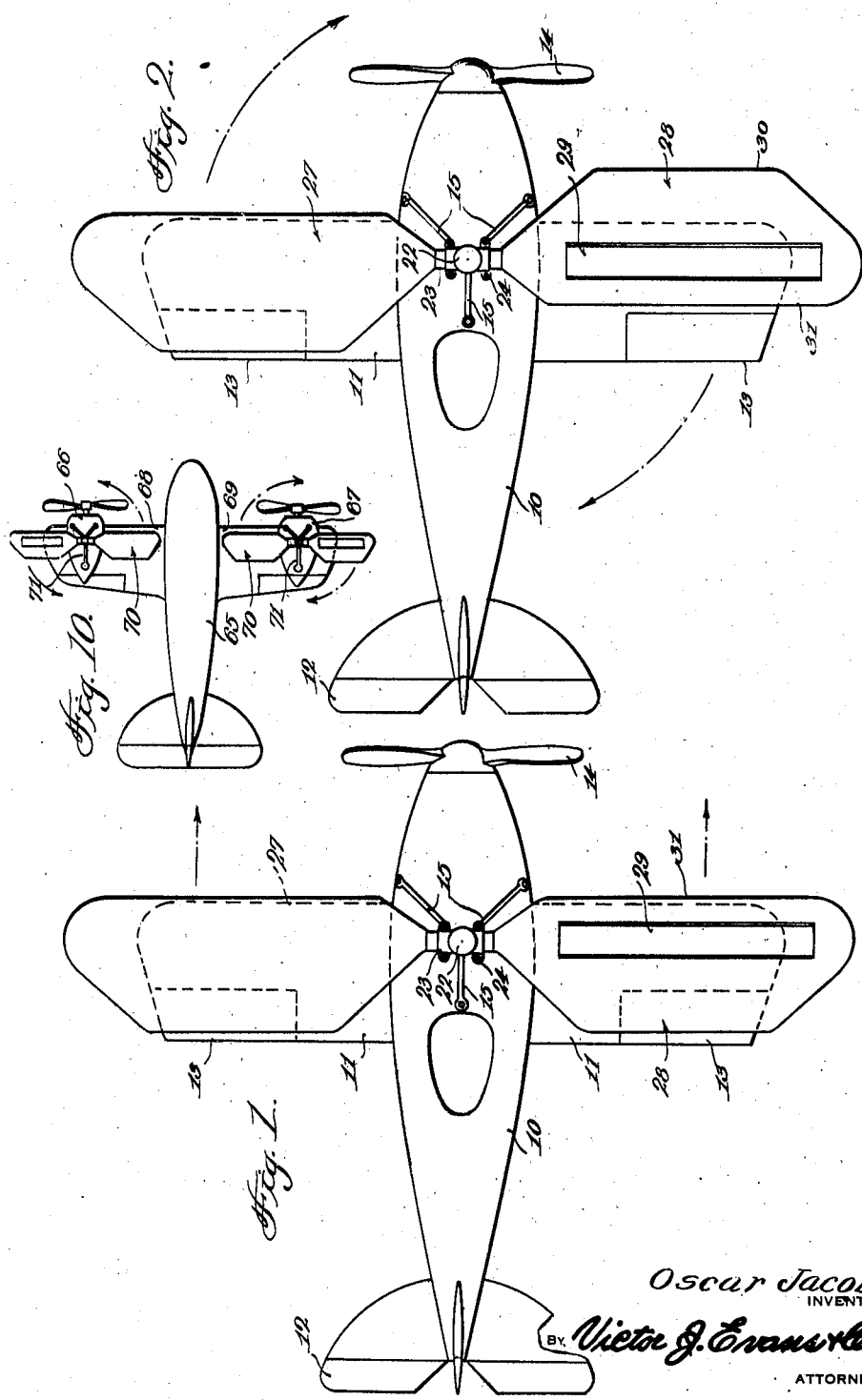

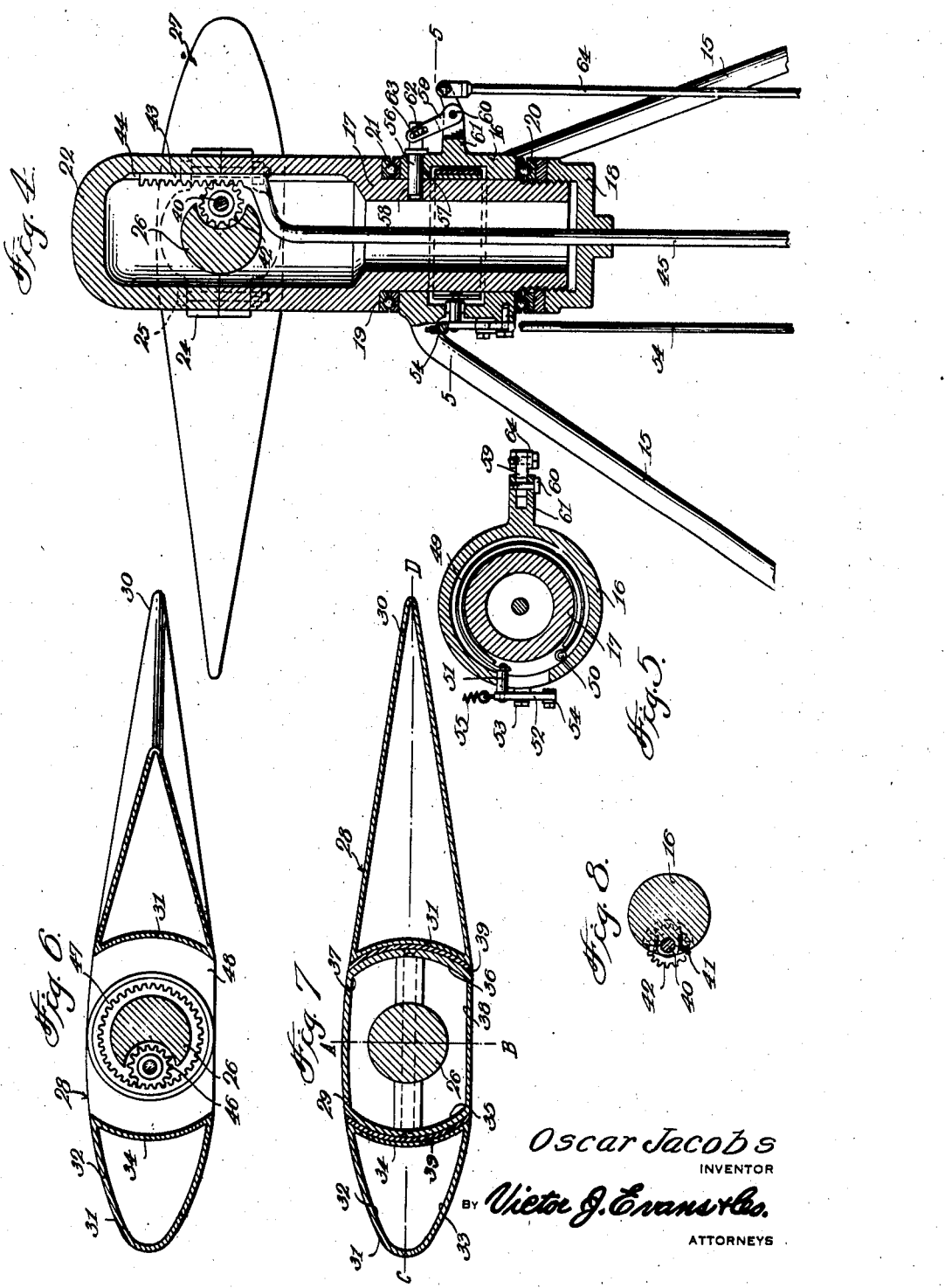

Patented Apr. 30, 1940

2,198,941

UNITED STATES PATENT OFFICE 2,198,941

ROTATING WING AIRCRAFT

Oscar Jacobs, Philadelphia, Pa.

Application March 18, 1939, Serial No. 262,692

2 Claims. (Cl. 244—7)

This invention relates to rotating wing aircraft and has for an object to provide a reversible wing and means for reversing the same to accomplish more efficient performance than hitherto possible.

Proposed airplanes of this type employ a rotating wing similar to an autogyro. When the desired altitude is reached, the rotating wing is stopped, turned to face forward, locked rigid, and then the airplane is flown as a conventional airplane. When landing the locking device is disengaged, the wing rotates, and the plane once again assumes the characteristics of the autogyro to land slowly.

However, such proposed planes have not been successful. The main difficulty is poor airfoil design. Prior airfoils have been shaped with the highest point about half way back from the leading edge in order that the wing provide lift when either stationary or when rotated. With this disadvantage in mind the present invention provides an airfoil having the highest point on its upper surface about one-third back from the leading edge and this provides the necessary lift and also promotes a streamlined contour of the airfoil regardless of whether the wing is stationary or rotating, which, in practice has been found to enhance performance.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 1 is a plan view of an airplane embodying a rotating wing constructed in accordance with the invention and shown with the wing in position to provide a rigid wing airplane.

Figure 2 is a plan view of the airplane shown in Figure 1 but with the right airfoil turned on its axis to face rearwardly for producing a rotating wing.

Figure 3 is a plan view of a wing constructed in accordance with the invention, with parts broken away and parts in section to show the means for reversing the right airfoil.

Figure 4 is an enlarged cross sectional view taken on the line 4—4 of Figure 3 showing the locking means, brake, and reversing means of the reversible airfoil.

Figure 5 is a cross sectional view taken on the line 5—5 of Figure 4 showing the brake.

Figure 6 is a cross sectional view through the reversible airfoil taken on the line 6—6 of Figure 3.

Figure 7 is a cross sectional view of the reversible airfoil taken on the line 7—7 of Figure 3.

Figure 8 is a detail cross sectional view taken on the line 8—8 of Figure 3.

Figure 9 is a plan view of a modified form of wing, with parts broken away and parts in section.

Figure 10 is a plan view of an airplane equipped with wing structure in accordance with the invention in which two wings are employed to counterbalance the torque of each other.

Referring now to the drawings in which like characters of reference designate similar parts in the various views, 10 designates the fuselage, 11 the wings, 12 the tail controls, 13 the ailerons and 14 the propeller of an airplane of conventional type.

In carrying out the invention a tripod formed of standards 15 is secured to the top of the fuselage and a stationary annular bearing 16, best shown in Figure 4, is secured to the top of the tripod in any preferred manner. A casing 17 is rotatably mounted in the bearing and is held therein through the medium of a flanged nut 18 threadedly engaged with the bottom of the casing, and a shoulder 19 formed on the casing above the bearing. Ball bearings 20 and 21 are disposed respectively between the nut and the bottom of the bearing and between the shoulder and the top of the bearing.

The casing is closed at the top through the medium of a cap 22 which is formed integral with a two-part hub 23 the sections of which are provided with flanges 24 through which securing bolts 25 are passed to permit assembly of the parts.

The rotating wing structure is supported by the hub 23 and comprises a shaft 26 which is rigidly fixed in the hub and extends at the ends parallel with the wings 13 of the airplane. On one end of the shaft a wing 27 is fixed, preferably the left end of the shaft, while upon the right end of the shaft a wing 28 is rotatably mounted so as to be turned through an axis of 180 degrees to present its leading edge turned through an angle of 180 degrees from the stationary position of the rotating wing structure, as shown in Figure 1, to present its leading edge in the direction of rotation of the rotating wing structure, as indicated by arrowheads in Figure 2, when it is desired to land slowly in the nature of an autogyro.

The right wing 28, which as before mentioned is turnable around its longitudinal axis, comprises a central longitudinal section 29 which is stationary and is fixed to the shaft 26 in any preferred manner. The trailing portion 30 and the leading portion 31 of the wing move as a unit around the fixed portion 29 when the wing is to be reversed from the position shown in Figure 1 to the position shown in Figure 2.

The shape of the axially rotatable wing 28 has much to do with the airplane's flight and performance, characteristics, economy of operation, speed and safety. Briefly, the leading portion 31 is symmetrical about the line C—D shown in Figure 7 extending from leading edge to trailing edge of the wing through the center of the shaft 26. The front section is curved convexly at the top surface 32 and bottom surface 33, and has a concave rear surface 34.

The center fixed section 29 is symmetrical about a line A—B drawn through the center of the shaft 26 perpendicular to the line C—D. It is not symmetrical about the line C—D, which latter bisects the arc of the circle which determines the convex curves of the front and rear surfaces 35 and 36 of the center section. The center of these curves is the axis of the shaft 26 and the radius thereof is equal to one-half the total width of the center section mentioned along the line C—D. The top surface 37 of the center section is convex and merges smoothly with the upper surfaces of the front and rear sections of the wing. The lower surface 38 may be either concave, flat, or convex, but in all events must merge smoothly with the lower surfaces of the front and rear sections.

The rear section is symmetrical about the line C—D which bisects the arc which determines the concave curve of the front surface 31 of the rear section. This front surface is part of the same circle which determines the concave curve of the rear surface 34 of the front section. The trailing edge of the rear section 30 is pointed and the front of the front section 31 is blunt or curved.

A filler 39 is interposed in the space between the front and rear surfaces of the center fixed section 29 of the axially rotatable wing 28 and may be secured to the center section 29 or the front and rear sections as desired.

For turning the wing 28 on its longitudinal axis through an arc of 180 degrees a stub shaft 40 is disposed longitudinally within a recess in the shaft 26 and is journaled near the ends in suitable bearings 41. As best shown in Fig. 4, one end of the stub shaft is equipped with a gear 42 which meshes with a rack 43 which is mounted to slide vertically in guides 44 carried by the rotating casing 17 and cap 22. A rod 45 is slidably mounted in the nut 18 and is integrally connected at its upper end with the rack 43 to remove the rack and rotate the gear with resultant rotation of the stub shaft. The opposite end of the stub shaft is equipped with a gear 46, best shown in Figure 6, which meshes with a ring gear 47 which is fixed to a transversely extending member 48 integral with the wing 28 as best shown in Figure 3.

The rod 45 may be manipulated by the pilot to reverse the leading edge of the axially rotatable wing 28 to a position in the direction of rotation of the wing or to a position parallel with the leading edge of the mating wing 27 as respectively shown in Figures 2 and 1.

After the plane has taken off and has reached the desired altitude, it is necessary to stop rotation of the rotating wing structure comprising the wings 27 and 28. For this purpose, by referring to Figures 4 and 5 it will be seen that a resilient brake band 49 is secured at one end to the stationary bearing 16, as shown at 60 and embraces the rotating casing 17. The free end of the brake band is connected to the crank arm 51 of a brake lever 52 which is pivoted centrally as shown at 53 on the bearing. A control rod 54 is connected to the free end of the lever for rocking the lever to set the brake band. A spring 55 is connected to the lever and to the exterior of the bearing, as shown in Figure 4, to normally hold the brake band released.

For locking the rotating casing 17 against rotation, a latch pin 56 is slidably mounted in registering openings 57 and 58 formed respectively in the stationary bearing 16 and rotating casing 17. A bell crank lever 59 is pivoted at its elbow as shown at 60 on a bracket 61 which projects from the stationary bearing. One end of the lever is provided with a slot 62 which receives a pin 63 which projects from the latch pin. The opposite end of the lever is connected to a control rod 64. By manipulating the control rod the bell crank lever may be rocked to withdraw the pin to permit rotation of the casing or may be rocked to insert the pin into the casing and hold the casing stationary.

A modified form of the invention is shown in Figure 10 in which a conventional airplane 65 is equipped with dual power plates 66 and 67 located on respective wings 68 and 69. In this embodiment of the invention rotating wing structures 70, duplicates of the wing structure above described in detail, are mounted on respective tripods 71 on the wings 68 and 69. The advantage of this modified form of the invention is that the torque of the propellers and rotating wings neutralize each other.

Another modified form of the invention is shown in Figure 9 in which the rotating wing structure is not essentially different from the rotating wing structure previously described with the single exception that in lieu of the stub shaft 40 having the gear 46 and ring gear 47 for rotating the wing 28, the last two named gears may be dispensed with and the stub shaft, designated by the numeral 72 in Figure 9, may be extended through the shaft 73 and at the end terminally connected to an integral part 74 of the rotating wing 75. All other parts are identical and have been given numbers corresponding to the parts previously described. When the stub shaft 72 is turned axially the wing 75 will be rotated through an arc of 180 degrees.

In operation when the plane is flying as an autogyro and the desired altitude has been reached, the pilot shifts the rod 45 to turn the wing 27 axially through an arc of 180 degrees to present its leading edge in alignment with the leading edge of the mating wing 27. The speed of the plane must be slowed down during this operation and the speed of the rotating wings reduced to a medium and for the latter purpose the brake 49 is applied by manipulation of the rod 54. When the wing has arrived at the predetermined position for flying the plane as a conventional airplane at great speed, the latch pin 56 is inserted in the opening 58 in the rotating casing by manipulation of the rod 64. To make a landing the above operations are reversed to first turn the axially rotatable wing 28 back through an arc of 180 degrees during which maneuver the wing will be presented broadside to the wind and will start rotating the entire wing structure including the wing 27 and 28, so that the aircraft will have the characteristics of an autogyro to accomplish a slow substantially vertical landing.

In all instances the angle of incidence of the rotating wing is between 4° and 12°.

From the above description it is thought that the construction and operation of the invention will be fully understood without further explanation.

What is claimed is:

1. In rotating wing structure for airplanes, a shaft, a wing rotatably mounted on the shaft to turn through an angle of 180 degrees to present its leading edge in either of two operative positions, a central section for said wing fixed stationary to the shaft, the surface of said central section merging smoothly with the upper and lower surfaces of the rotatable section of the wing in either of the two operative positions of the rotatable section, and means carried by the stationary section and connected to the rotatable section of the wing for rotating the wing axially.

2. Rotating wing structure for aircraft comprising a shaft, a wing carried by the shaft including a front section, a central fixed section, and a rear section, the front and rear sections being integral, the front section being symmetrical with respect to a plane extending from the leading edge to the trailing edge of the wing through the center of the shaft and having a concave rear surface, the center section being symmetrical with respect to a plane extending through the center of the shaft perpendicular to the first named plane, the top surface of the center section being convex and merging smoothly with the upper surface of the front and rear sections, the center section having convex curved front and rear surfaces, the concave front surface confronting the convex rear surface of the front section, the rear section being symmetrical with respect to the first named plane and having a front concave surface confronting the rear concave surface of the center section, the trailing edge of the rear section being pointed and the leading edge of the front section being blunt.

OSCAR JACOBS.